Patented Nov. 22, 1932

1,888,624

UNITED STATES PATENT OFFICE

WILHELM ECKERT AND HEINRICH GREUNE, OF FRANKFORT-ON-THE-MAIN-HOCHST, AND WILLY EICHHOLZ, OF MANNHEIM, GERMANY, ASSIGNORS TO GENERAL ANILINE WORKS, INC., OF NEW YORK, N. Y., A CORPORATION OF DELAWARE

PREPARATION OF VAT DYESTUFF ISOMERS OF THE 1.4.5.8 NAPHTHOYLENE DIBENZIMIDAZOL SERIES AND THE PRODUCT

No Drawing. Application filed April 4, 1930, Serial No. 441,712, and in Germany April 15, 1929.

In the U. S. Patent No. 1,588,451 there is described a process which comprises condensing an 1.4.5.8-naphthalenetetra-carboxylic acid compound with an ortho-diamine compound. The products thus obtainable are valuable dyestuffs, although they are not of uniform constitution, but rather represent mixtures of isomeric dyestuffs. When condensing, for instance, 1.4.5.8-naphthalene-tetra-carboxylic acid with ortho-phenylenediamine a mixture of the two isomeric dyestuffs of the following formulae:

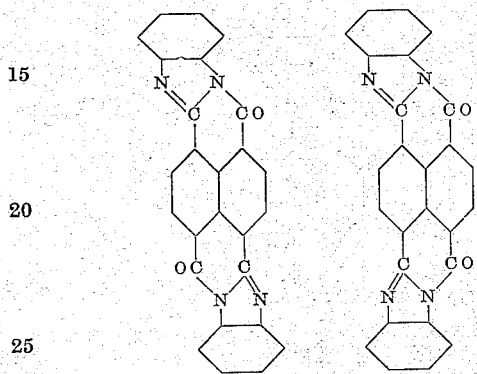

is obtained. When condensing a substituted ortho-phenylene diamine with 1.4.5.8-naphthalenetetra-carboxylic acid in many cases the same holds true, i. e. there is likewise obtained a mixture of the two isomers.

The present invention relates to a process of separating the dyestuff mixtures obtainable according to U. S. Patent No. 1,588,451 into their two components. Another object of our invention are the purified dyestuffs obtainable according to our new process.

We have now found that the separation of the dyestuff mixtures obtainable according to U. S. Patent No. 1,588,451 can be effected with a good yield by dissolving the dyestuff mixture in concentrated sulfuric acid and causing the dissolved dyestuffs to fractionally crystallize from the sulfuric acid solution by either diluting or cooling the sulfuric acid solution. In the examples hereafter following our process and the properties of the dyestuffs obtainable thereby are more fully described, the parts are by weight:

(1) 100 parts of the isomeric mixture of 1.4.5.8-naphthoylene dibenzimidazol of the following formulae:

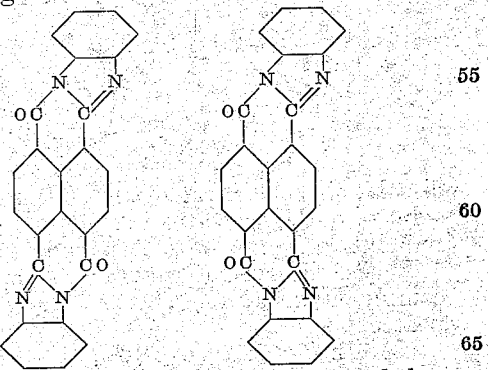

(obtainable by condensing 1.4.5.8-naphthalenetetra-carboxylic acid with 2 mols of ortho-phenylenediamine according to U. S. Patent No. 1,588,451) are dissolved in sulfuric acid of 66° Bé., while stirring. To this solution is gradually added, while stirring and cooling, such a quantity of ice, that the temperature of the solution during the introduction of the ice does not exceed 30° C.–35° C. until the precipitation of the more difficultly soluble orange part of the mixture is complete. The sulfate which has been precipitated is filtered by suction by means of filter stone, glass beads or asbestos. The solid matter is then decomposed with ice, the dyestuff is filtered by suction, washed until neutral and dried. It is an orange red powder of the following formula:

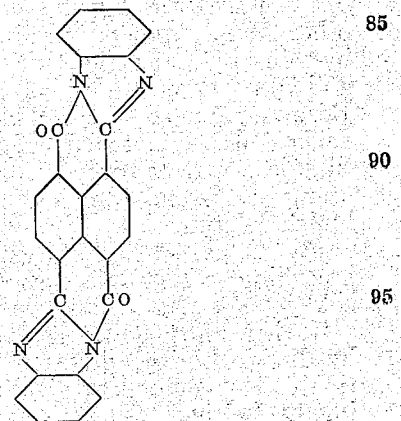

and dissolves in monohydrate to a brownish solution. It dyes cotton in an olive vat very brilliant orange tints of excellent fastness properties.

The sulfuric acid filtrate is poured on ice and worked up in the manner above described. The deep red dyestuff thus obtainable which has the following formula:

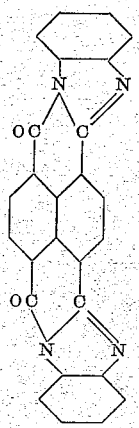

dissolves in concentrated sulfuric acid to a red solution and dyes cotton in an olive vat bluish red tints of very good fastness properties.

In case the dyestuff mixtures have not been completely separated, the process can be repeated.

(2). Into a mixture of 160 parts of sulfuric acid of 66° Bé. and 40 parts of sulfuric acid of 60° Bé. there are introduced 20 parts of the starting material used according to Example 1. The whole is heated for a short time to about 90° C. and allowed to cool while stirring. The precipitated dyestuff after standing for a prolonged time, is filtered by suction, washed and decomposed with water. It is an orange product which has the same properties as that obtainable according to Example 1. From the sulfuric acid mother liquor there is obtainable by precipitation with water the corresponding red product giving an alkaline hydrosulfite vat from which cotton is dyed red tints which when the material is exposed to the air, change to bluish-red tints of very good fastness properties.

By mixing the ingredients in a proportion other than that above indicated, for instance, by using 130 parts of sulfuric acid of 66° Bé. and 70 parts of 60° Bé., or 100 parts of 60° Bé. and 100 parts of 66° Bé. or only sulfuric acid of 66° Bé., the dyestuff mixtures are likewise separated into a component dyeing orange tints and into a component dyeing bluish red tints.

(3). 20 parts of the starting material used according to Example 1 are dissolved in the cold in 50 parts of chlorosulfonic acid and sulfuric acid of 60° Bé. is slowly added drop by drop, while stirring, until the precipitation of the component yielding orange dyeings is finished. The precipitate is filtered by suction, washed with sulfuric acid of 60° Bé., decomposed with water, washed until neutral and dried. It dyes cotton orange tints.

From the mother liquor there is obtained by precipitation with water the component of the dyestuff mixture yielding bluish red tints.

We claim:

1. The process which comprises dissolving such a dyestuff mixture as is obtainable by condensing a 1.4.5.8-naphthalene-tetra-carboxylic acid compound with an ortho-diamine compound, in concentrated sulfuric acid and subjecting the solution to a fractional crystallization.

2. The process which comprises dissolving such a dyestuff mixture as is obtainable by condensing a 1.4.5.8-naphthalene-tetra-carboxylic acid compound with an ortho-diamine compound, in concentrated sulfuric acid of 66° Bé. while heating to a temperature of about 90° C.–100° C., cooling down the solution, filtering and treating the filtrate as well as the residue with water.

3. As a new product the dyestuff of the following formula:

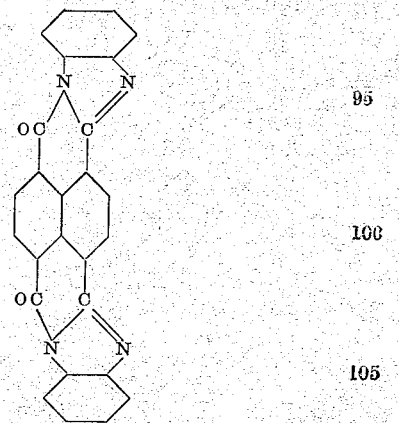

forming in the dry state a deep red powder, dissolving in concentrated sulfuric acid with a red color and dyeing cotton from an olive colored vat red shades having a bluish tint and possessing excellent fastness properties.

In testimony whereof, we affix our signatures.

WILHELM ECKERT.
HEINRICH GREUNE.
WILLY EICHHOLZ.